United States Patent [19]

Castleman

[11] Patent Number: 4,647,834
[45] Date of Patent: Mar. 3, 1987

[54] BATTERY CHARGER

[76] Inventor: Cordell V. Castleman, 10144 Pleasant Ave. South, Bloomington, Minn. 55420

[21] Appl. No.: 682,553

[22] Filed: Dec. 17, 1984

[51] Int. Cl.[4] ............................................. H02J 7/04
[52] U.S. Cl. ...................................... 320/43; 320/31; 320/37; 361/245; 361/246
[58] Field of Search ............................. 320/31, 43, 37; 361/245, 246

[56] References Cited

U.S. PATENT DOCUMENTS

| | | | |
|---|---|---|---|
| 3,273,039 | 9/1966 | Godshalk et al. | 361/246 X |
| 3,680,072 | 7/1972 | Charbonnier et al. | 320/43 |
| 3,733,534 | 5/1973 | Saslow | 320/23 |
| 3,854,082 | 12/1974 | Nasby | 320/22 |
| 3,867,681 | 2/1975 | Bishop | 320/21 |
| 3,887,858 | 6/1975 | Burkett et al. | 320/31 |
| 4,035,709 | 7/1977 | Selder | 320/23 |
| 4,052,656 | 10/1977 | Lavell | 320/23 |
| 4,061,956 | 12/1977 | Brown | 320/22 |
| 4,209,736 | 6/1980 | Reidenback | 320/22 |
| 4,225,815 | 9/1980 | Lind et al. | 320/39 |
| 4,238,721 | 12/1980 | DeLuca | 320/18 |
| 4,290,002 | 9/1981 | Piotti | 320/20 |
| 4,320,333 | 3/1982 | Hase | 320/43 |
| 4,341,988 | 7/1982 | Small | 320/31 |
| 4,388,582 | 6/1983 | Saar | 320/20 |
| 4,399,396 | 8/1983 | Hase | 320/43 |
| 4,418,310 | 11/1983 | Bollinger | 320/39 |

Primary Examiner—Patrick R. Salce
Assistant Examiner—Mark D. Simpson
Attorney, Agent, or Firm—Leo Gregory

[57] ABSTRACT

This invention relates to a battery charger which includes a timer which becomes energized upon a battery approaching a fully charged condition and the timer then commences a preset timed equalization or finishing charge which brings each cell of the battery into a 100% fully charged condition. The battery may remain connected to the charger which includes a restart monitor which causes the charger to automatically re-charge the battery to a fully charged condition when it senses that the battery is losing its charge.

9 Claims, 3 Drawing Figures

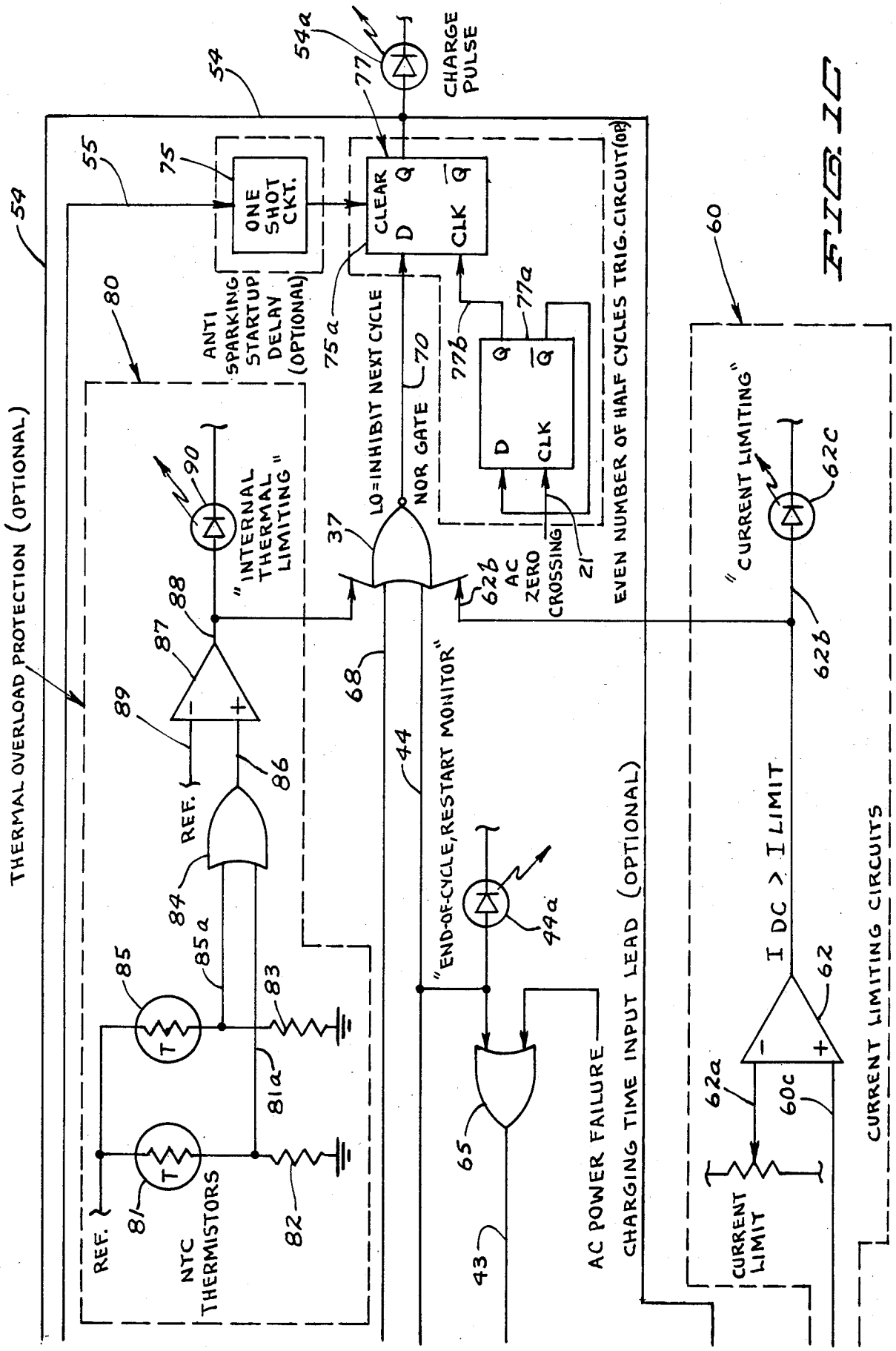

BATTERY CHARGER

BACKGROUND OF THE INVENTION

1. Field of Invention

This invention relates to an electric battery charger.

2. Description of the Prior Art

When a battery is charged up to what is referred to as a basic charged condition, it is about 85% charged and the individual cells may be at different charged levels. It is desirable to apply a finish or equalization charge to the battery which is intended to bring each cell of the battery up to a 100% charged condition. Conventional battery chargers attempt to attain a fully charged condition in various ways.

Conventional electric battery chargers are of three general types. There is a simple unregulated taper charger. The finish charge of the battery is not regulated with respect to the line voltage. There is no regulation and no automatic shut off.

There is a so-called automatic battery charger which is like a taper charger except as the battery voltage approaches its high finish value, the finish charger or voltage is limited to a preset value such that possible damage to a battery will be reduced. The finish voltage will be constant and at its proper setting for the general type of battery being charged but not necessarily for the particular condition of the battery.

The third type of conventional battery charger is a deep cycle charger having an electric timer to be set manually by the user to bring the battery to what the user believes will be a full charge and to include an adequate equalization charge. This is a mechanical timer and it does not sense when the equalization charge begins and whether the timer has been set correctly.

With this third type of battery charger, if the battery is more discharged than thought to be, the total time for the charge and equalization charge will be insufficient to equalize the charge within the battery. If the timer is set for too long a time, the total charge will be excessive causing water in the battery to become decomposed and often also leading to corrosion of the electrodes.

It is desirable to have a timing apparatus included in a battery charger such that the equalization timer does not turn on until the basic charge is completed and then the equalization charging time is set precisely for the equalization or finish charge.

SUMMARY OF THE INVENTION

The structure comprising the invention herein represents substantial improvement in controlling the charging of a battery. When a battery is said to be fully charged, it may be only 80% or 85% charged and to get a 100% charge requires what is referred to herein as an equalization charge. Some prior art devices attempt to accomplish this by an improperly applied overcharge which may result in damage to the battery.

The structure herein safely brings a battery up to a basic charge or what is about 85% of its complete charge at which point an equalization charge timer is preset to achieve a 100% or complete charge without overcharging. The increment of charging to achieve a 100% charge is termed an equalization or finish charge which brings each cell of the battery up to substantially a 100% charge and the battery is prevented from becoming overcharged. Any interruption of the charge as by a power failure will not set the timer back to zero, but instead when power is restored, the timer continues from the time interval at which power was stopped. Further when a battery is in storage or not in use, the battery tends to lose its charge, which condition is automatically sensed and which then causes the battery charger to restore the battery to a full 100% charge on an ongoing basis.

It is a particular object of the invention herein therefore, in view of the above summary, to provide an apparatus to safely charge batteries to the extent of a conventional charge and to further apply to the battery a timed equalization charge which will fully charge each cell of the battery.

It is a further object of this invention to automatically maintain and to restore a battery to be in a fully charged condition.

These and other objects and advantages of the invention will be set forth in the following description made in connection with the accompanying drawings in which like reference characters refer to similar parts throughout the several views.

BRIEF DESCRIPTION OF THE DRAWINGS

There is one Figure referred to generally as FIG. 1 which is shown in three segments as 1A, 1B and 1C. The circuit consists of a block type wiring diagram showing sub-circuit portions thereof by dotted line.

DESCRIPTION OF A PREFERRED EMBODIMENT

Figure 2A:
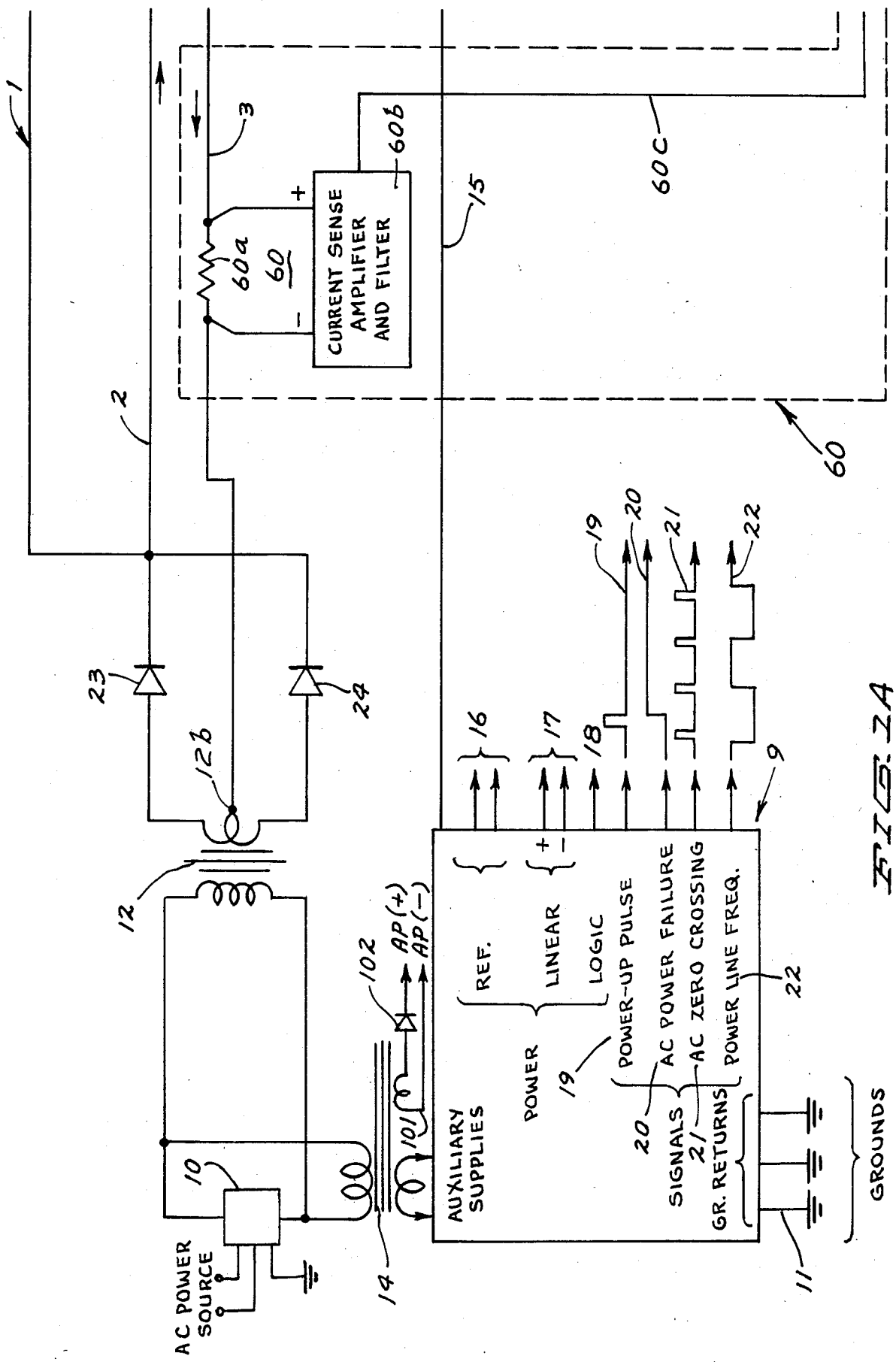
Figure 1B:
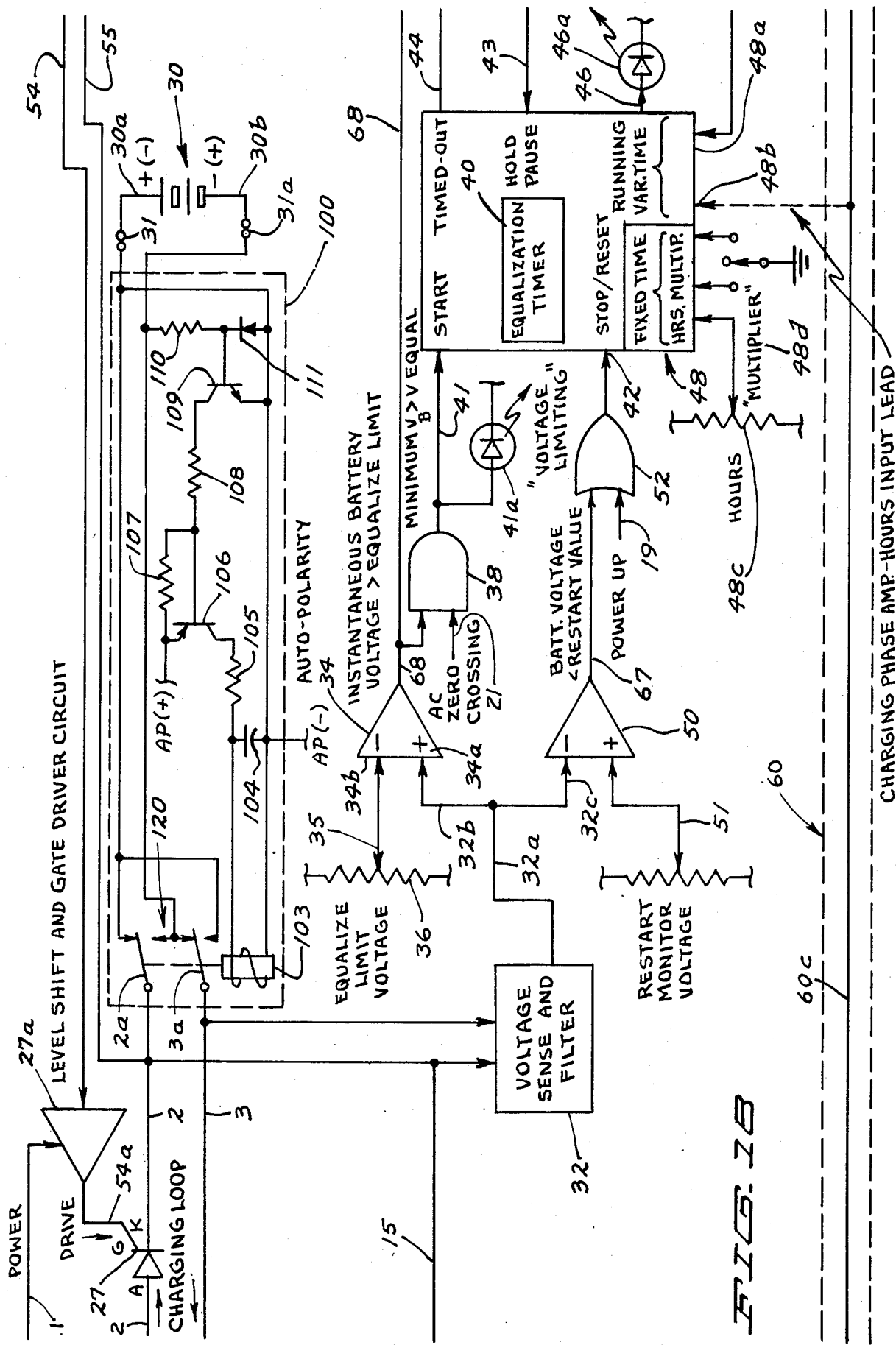

Referring to FIGS. 1A, 1B and 1C, there is shown a functional block diagram of applicant's circuitry, said circuitry being indicated generally by the reference numeral 1.

The circuitry for the most part will be described in connection with a description of the operation thereof.

An AC power source 10 connects to the primary of a transformer 12 and of a transformer 14. The main transformer 12 is designed to have its output voltage fall off with increasing current and the transformer 14 represents a conventional transformer designed to have a low regulation, that is, its output voltage does not fall off any significant amount with increasing current.

The use of the two transformers as described is for purpose of illustration and not for the purpose of limitation and though preferable, like results could be attained by the use of a single transformer and a modification of the power supply.

A secondary transformer 14 connects to an auxiliary power supply 9 which includes the circuitry shown and provides output for the following elements of the battery charger:

1. Precision reference voltages 16 which provide voltages against which voltages and currents are compared.
2. Linear power 17 which supplies power to the amplifiers and voltage comparators.
3. Logic power 18 which provides power to the AND gates, OR gates and other logic circuits.
4. Various ground returns 11.
5. The following signals are energized:
    a. The power up pulse signal 19 which goes high and then drops low the instant that AC power and a new battery are both supplied.
    b. The AC power failure signal 20 which changes state when AC power is lost and reverts to original state when AC power is restored and is used to cause the timer to stop increasing time without losing the record of the time accrued.

c. The AC zero crossing signal 21 which goes high briefly as the AC power is at or near zero.

d. A power line frequency 22, of the same frequency as the AC power frequency which is used to insure that the SCR 27 will be on for two consecutive half-cycles or one whole cycle of AC power line frequency.

The signal 22 may be applied directly to the clock input of 77 of flip-flop 77 as an alternative to the use of flip-flop 77a generated from input 21 applied as shown.

The main charging path in the circuitry 1 is described as follows.

Power from the AC power source 10 is applied to transformer 12 which reduces the voltage of the power source to a level suitable to be applied to the battery to be charged. Said power is then applied to the rectifier diodes 23 and 24 for conversion to a pulsating direct current. The outputs of said diodes by lines 2 and 3 are applied to the anode A of SCR 27 which, when triggered on by a positive signal on its gate lead G, will allow the current to proceed to its cathode K through the relay 120 to the positive terminal 30a of the battery 30 through connecting means (such as clamps) 31, through the battery 30, and on a return path from the negative battery terminal 30b through connecting means (clamps) 31a, back through said relay 120, through the resistor 60a in line 3, and back to the center tap 12b of the transformer 12.

It is desirable to use the transistor 60a but the same may be omitted and a direct connection be made to the center tap 12b of the transformer 12. The relay 120 is preferably used but may be replaced by direct connections through the normally closed contacts of said relay.

The particular method of SCR control herein with said pulsating direct current is half cycle control, that is to say, the SCR is turned on at the beginning of each half cycle and remains on through the complete half cycle, without the gate turn-on signal being delayed in phase, as is common in phase control systems. Preferably, consecutive pairs of half cycles are controlled (whole cycle control). However half cycle, whole cycle or phase control approaches are embodied within the concept herein.

There will be a one half cycle of charging current present every time the SCR is gated on at the beginning of each half cycle. If said SCR is not gated on, there will be no current for that half cycle. The SCR will remain off until a trigger-pulse is applied to its gate lead G and then for as long as current is flowing, said SCR will remain on. Said SCR will turn off again when the current approaches zero. Said SCR is triggered by a positive signal applied to its gate lead G by means of circuit block 27a which is the level shift and gate driver circuit for said SCR.

A voltage from the cathodes of diodes 23 and 24 proceeds along line 1 to the power input of said block 27a. If there is a positive logic level on line 54 applied to the control input to the driver block 27a, then the internal transistor switches (not shown) will close allowing the power to proceed to the output along the line 54a to said gate G of said SCR 27.

If the logic level is zero on line 54, the switches internal to block 27a will remain open. Power will not be applied from line 1 through SCR gate A and said SCR will remain open.

It is well now to consider the control aspects of the invention.

The primary control or charging path is concerned with voltage and time control, the same being accomplished with the use of a voltage sense and low pass filter circuit block 32. Said block 32 is connected to the positive and negative leads of the battery 30 to be charged as an input and has its output on line 32a which is a moderately filtered voltage proportional to the average battery voltage. This voltage is applied through line 32b to comparator 34 at its non-inverting input 34a. The inverting input 34b of comparator 34 connects to a reference voltage from line 35. As shown here, said reference is derived from a potentiometer 36 having both its ends connected to reference voltages.

The reference voltage of line 35 is set to be a voltage proportional to the absolute maximum voltage desired to be impressed upon the battery. Herein, this maximum voltage is called the Equalization Limited Voltage, or simply equalization voltage. Equalization voltage is maintained at the battery terminals during the equalization or finish charge phase, after the basic charge is completed. The output of the charger is designed not to exceed the equalization voltage through the following means.

First, assume that the battery voltage is well below the equalization voltage. In this case, the equalization limit voltage reference 35 will be greater than the output on line 32b from said voltage filter block 32, such that the output of the comparator 34 will be nearly zero on line 68; in other words, a low logic level.

Assuming that all other inputs to the NOR gate 37 are also low, then output of the NOR gate 37 on line 70 will be high. Assume that circuit block 77 D-type flip-flop is replaced by a direct connection from the D input to the Q output of said flip-flop such that line 70 is connected directly to line 54. Since line 54 is at a high logic level, the level shift and SCR gate drive circuit block 27a will make a connection from its input lead, line 1, to its output 54a, the gate G of SCR 27.

At every half cycle of input power therefore, said SCR will be triggered on and the battery will receive a pulse of charging current. Charging will proceed continuously.

The voltage across the battery now rises and continues to rise until at some point voltage on line 32b exceeds the voltage on line 35 so that comparator 34 changes state presenting a logic high on its output line 68. The output of the NOR gate 37 then goes low so that line 70 and therefore line 54 are also low. Block 27a therefore opens its connection from line 1 to the SCR gate G and no longer triggers the SCR. Current flow to the SCR ceases with the end of the half cycle.

Since the battery now is no longer being charged, its terminal voltage decreases and so does the voltage on line 32b. When the voltage on line 32b becomes less than the fixed voltage on line 35, the output of comparator 34 on line 68 goes low. This permits the output of the NOR gate 37 to again go high.

With the high on line 70 and therefore line 54, block 27a closes its switches, allowing line 1 to apply power to the gate G of SCR 27, turning it on again. This cycle repeats such that the effect is to maintain a voltage on the battery which, on the average, is equal to the equalization voltage. The charger will maintain the battery at the equalization voltage indefinitely except for the further path into the NOR gate 37 by line 44, provided by the equalization timer 40.

The setting of the equalization timer 40 may be described as follows. Inputs 41 and 42 are pulse responding inputs. That is to say, the timer will start timing by a pulse at input 41. This is accomplished by simultaneous highs to the inputs of AND gate 38.

As soon as a new battery is connected, as sensed by line 15 feeding into block 9 and AC power is applied, a pulse is applied to the input of gate 52 by means of line 19. OR gate 52 propagates this pulse to line 42, the stop-reset line of equalization timer 40.

Said equalization timer then sets both of its output lines 44 and 46 to logic low levels and internally, its time registers (not shown) are reset to zero. The timer will continue to do nothing even though the reset pulse line 42 returns to a low level until such time as a pulse is applied to line 41, the start input. When a pulse is momentarily applied to the start input line 41, then the internal registers of said equalization timer begin accumulating time and the timing-in-process output 46 causes the timer running LED 46a to begin flashing to assure the operator that said equalization timer is operating. The timed output 44 remains at a logic low even though said timer 40 is running until the time settings 48 of the input timer have been satisfied. For example, if the total time is to be one hour, then no change will occur on line 44 until one hour after the time that the input pulse is applied to line 41. The equalization timer is thus a delay circuit which produces a logic high level on line 44 at a time interval after the presence at a start pulse on line 41 as determined by the time setting inputs on all of the lines to 48a. In the basic embodiment of this invention, these inputs are selectably fixed times as determined by the voltage from the hours potentiometer 48c and by the setting of the multiplier switch 48d.

In other embodiments, however, the time might be a fixed time plus a variable time as determined by the inputs to line 48a; the total length of time that charging has occurred, or by the inputs to line 48b, the total number of amp hours returned to the battery until the equalization voltage across the battery has first been reached. No matter whether a fixed or variable or combination time is used, however, the salient feature of the timer is that it does not begin until the basic charge of the battery has been attained. Subsequent to this event, the output line 44, does not change state, that is, go high until the time period called for has elapsed. It is important to recognize that the equalization timer is controlling the equalization phase of the charging cycle only and that the timer does not start prior to sensing the first attainment of the basic charge voltage across the battery. This differs from the usual prior state of the art in which the timer is running not only for the equalization charging phase, but for the entire charging phase prior to the attainment of the basic charge of the battery.

Going back to the overall circuit description, assume that line 41 has gone high, indicating that the basic charge is complete and the equalization voltage has been achieved, the timer will start running internally and its line 46 output will cause the LED 46a to flash but its main output line 44 will still not change state. This means that the output of the NOR gate 37 is controlled solely by input equalization voltage line 68 and, as such, an average voltage across the battery equal to the equalization voltage is maintained, for a time period determined by the inputs 48 and at the expiration of said time period, the output line 44 will go high and remain high. A feedback path through gate 65 and thence to input 43 will cause the internal timing to go into a hold mode thereby forcing the output line 44 to remain high. That is to say, once time-out has been achieved on line 44, the internal timing operations will cease and the timer output will be held high. The logic high on line 44 is applied to the NOR gate 37 so that its output 70 goes low.

Line 54 goes low causing block 27a to open the drive to the gate G of SCR 27 thereby causing all charging current to cease. Charging current will not resume even when the battery terminal voltage again falls below the equalization limit. This is because the input 43 to the equalization timer 40 causes its output line 44 to remain high indefinitely, for hours, weeks or even months. Output line 44 will remain high until input line 42, for purpose of stop or reset, again receives a pulse. During this phase, LED 44a illuminates, indicating the end of the cycle; that the basic charging and the equalization charging are both completed and the charger is now in a maintaining or babysitting phase called Restart Monitor.

As the battery stands, open circuited, over a period of time, it begins to self-discharge as terminal voltage slowly drops off with time. Eventually its voltage will fall below a level represented by item 51, restart monitor voltage. When this occurs, the voltage on line 51 will exceed the voltage on line 32c such that comparator 50 will switch state so that its output line 67 will go to a high logic level. Said output will feed to OR gate 52 and be applied to line 42 which is the stop or reset input to said equalization timer. When this pulse is applied to said equalization timer, the interval registers of said timer again go to zero and all of its outputs also go to zero, including output 44. When output 44 goes to zero, again all four inputs to NOR gate 37 are low and therefore the output line 70 goes high, and line 54 applies a high to block 27a again, applying a drive to the SCR and charging recommences. Note that this may be weeks after charging has originally ceased. The charger herein will then go through the entire basic charging and equalization charging phases again, including the equalization timing, before the equalization timer again cuts off charging via its output line 44. The battery is thus maintained in a state of charge readiness without being overcharged by excessive equalization time. The basic operation of the battery charger herein thus consists of the equalization timer beginning its timing period as equalization voltage is first attained and which continues to time internally, during which time equalization voltage limit is maintained by comparator 34, which, at the end of the equalization charging period, applies an output on line 44 to terminate the charging process until such later time when the battery voltage falls below the restart level indicating that it has lost charge, and again needs to be recharged.

Reference is now had to AND gate 38, with its inputs from comparator 34, line 68 and the zero crossing input line 21. The reason for said AND gate is to assure that the equalization timer 40 does not start until the Vmin voltage of the battery exceeds the equalization voltage limit. The term 'Vmin voltage' as used herein is defined as the instantaneous voltage at the battery terminals during those instants when the current is substantially zero; e.g., during zero voltage instants of the AC power line. Without this gate, the voltage on line 32a and 32b and thereby the output of comparator 34 on its output lead 68 would sense not just the battery terminal voltage, but also the IR drop across the lines to the battery caused by charging current. As such, the equalization timer would start too early; it would begin timing when the voltage at the charger exceeded the equalization voltage limit and not when the voltage at the battery exceeded that limit due to the additional voltage drop along the leads to the battery. Said AND gate 38 insures that the input to the equalization timer start lead 41 will go high only when the instantaneous battery voltage, at instants of pracatically no current through it, exceeds the equalization voltage limit. This is because the AND gate 38 is enabled by line 21 only at the zero crossing point of the AC power input and therefore, by definition, no current will be flowing into the battery. Likewise, the voltage limiting LED 41a will also be turned on only when the instantaneous battery voltage exceeds the equalization limit with no current flowing through the battery. In effect, the AND gate 38 causes the circuit to behave as a minimum or "valley" Vmin voltage detector which looks at the minimum voltage across the battery and not the voltage while current is flowing. The essential operation of the battery charger herein has now been described.

Modification to said circuit 1 will next be described.

A block circuit 77 D-type flip-flop is provided. The purpose of this flip-flop is to prevent an odd number of half cycles from being triggered on the SCR 27. The circuit would still be functional. However it would be possible to conduct an odd number of half cycles of current through the secondary of transformer 12; for example, half cycles numbered 1, 3, 5, etc., which would constitute a DC component in the secondary of said transformer causing excessive noise and self-heating. Operation of the charger is quieter and cooler with the addition of flip-flop 77 which is a conventional edge-triggered D or data type flip-flop well known in the art. A low-to-high logic level transition applied to the clock input line 22 will cause whatever instantaneous logic level is present on said flip-flop input line 70 to be transferred to its Q output line 54. Said Q output line will then remain in this state until the next low to high transition on the clock input. Since the clock input is connected to a square wave of frequency equal to the power line frequency, it will receive a low-to-high transition once every whole cycle of the AC power line. Therefore, whatever logic level is present on line 70 at the instant of this transition will be held constant on the Q output line for the next two half cycles. This assures that no DC component will be present in the secondary of transformer 12.

Further, a modification to said flip-flop circuit 77 is the clear or reset input 75a from the one shot anti-sparking circuit 75. The purpose here is to prevent sparking at the charger clamps 30a and 30b should they be connected to a battery with AC power applied. Because the flip-flop 77 may have its output at either of two states, it is possible that line 54 will be at logic high at the instant that the clamps are applied. In this event, said SCR 27 will be triggered on and sparking would occur. To prevent this, said anti-sparking start-up delay block circuit is included. At the instant the charger clamps 31 and 31a are connected, a positive signal from the battery is sent via line 55 into said circuit 75. Circuit 75, as a one-shot circuit, then produces a logic high pulse for approximately one second to the clear input of the flip-flop 77. The pulse is usually long enough to allow the clamps to be firmly applied and left applied, thus preventing sparking. As the pulse disappears, the flip-flop 77 is free to function normally, and charging, if commanded for, will begin. The charge pulse LED 54a is included as information to the operator.

Considered next are the remaining two inputs to the NOR gate 37. Begin with line 62b, the current limit input. Beginning at the resistor 60a, the circuit 60 consists of the current sense resistor 60a, the current sense amplifier and filter 60b, a comparator 62, and a reference voltage source 62a. Charging current to the battery produces a voltage across resistor 60a, which is amplified by the current sense amplifier and filter 60b, to produce a DC output voltage on line 60c which is proportional to the gain of said amplifier A, the value of the resistor 60a and the average current through the resistor $I_{dc}$. The voltage on line 60c will proportional to the long term DC average current into the battery and not to the instantaneous values of the pulsating current to the battery. If the average current into the battery exceeds a preset limit, as determined by the voltage on line 62a, then the voltage on line 60c will exceed the voltage on 62a causing comparator 62 to go to a high state, that is, to present a logic high level on line 62b. This will allow the current limiting LED 62c to illuminate as such an indication to the operator. The high level on line 62b will be applied to the NOR gate 37, causing its output 70 to be a low, thereby shutting off said SCR. At this time the average current will again drop below the preset level so that the voltage on 60c will be less than the voltage on 62a. The comparator 62 will then go to a logic low and the logic low level on line 62b will allow the NOR gate 37 to output a high on line 70 allowing charging to resume again. In this way, the absolute average current output of the charger may be controlled not to exceed the preset limit.

The final input to the NOR gate 37 is a line 88 from the thermal overload protection block circuit 80, which as here shown, comprises negative coefficient thermistors 81 and 85, although one or more than two thermistors could be used. A reference voltage is applied to said thermistors, which, in this embodiment, are respectively placed in thermal contact with said SCR 27 and the transformer 12. Additional thermistors may be used, depending upon the degree of protection desired. Although the thermistors are identical in type, they control different temperatures by virtue of the fact that the respective related resistors 82 and 83 are different in value. The resistance of 82, for example, is designed to be such that at the desired limiting temperature of said SCR, the voltage present on line 81a produces an output voltage on line 86 equal to the reference voltage on line 89. Any further increase in the temperature of said SCR, for example, will cause a further increase in voltage on line 86, causing comparator 87 to have a logic high level at its output. This will cause the LED 90, indicating internal thermal limiting, to illuminate as a signal to the operator and line 88 to have a logic high level which will cause the NOR gate 37 to have a low level on its output 70. Said SCR will thus not be gated, so that charging current will cease until said SCR cools in temperature, causing thermistor 81 to increase in value again, allowing line 88 to go to a logic low permitting reestablishment of charging current.

Similar comments apply to thermistor 85 and its resistor 83 which can be different in value from 82 such that thermistor 85 senses a different temperature from thermistor 81. In this embodiment, for example, permitting the temperature of said transformer to be higher than the temperature of said SCR 27, although both are limited to their respective maximum temperatures. Element 84 having as its input lines 81a and 85a is really not a logical OR gate but a linear gate, which allows the higher of the two voltages present from thermistors 81 or 85 to determine the voltage on line 86. Thus a single comparator 87 may serve a pair or a multiciplicity of thermistors.

Any number of thermistors which may be employed will all control a common output on line 88. It will be seen that the NOR gate 37 produces a low output on its line 70 in response to any one or more of the input lines 62b, 68, 88, and 44. Although in practice, only one of these inputs will be at a logic high depending upon whether the charger is in the current limiting, voltage limiting, temperature limiting, or a timed out mode. It is important to realize that any one of the inputs will cause said SCR not to be retriggered. This permits charging to stop in response to excessive temperatures, a set point current, a set point voltage of the equalization limit voltage, or attainment of a preset equalization time from the timed out line 44 of the equalization timer block 40.

The salient feature of the invention is thus seen to be said equalization timer 40 which begins timing as soon as and not before the battery voltage attains a basic voltage level when current through the battery is instantaneously zero, and which thereby senses what is regarded as a full charge on the battery and which then causes the charger to maintain a constant output voltage called the equalization limit, for a time determined by the equalization timer. Only then does equalization charging cease. At that point, a monitor senses the gradual decrease in terminal voltage which would indicate self-discharge of the battery over a long time period, indicating the need for an additional recharge and reequalization cycle, and returning again to the monitoring mode.

Reference is now made to block circuit 100 referred to as the autopolarity circuit. This circuit allows the operator not to be concerned as to the polarity of the connecting means 31 and 31a. If the clamps are transposed, a relay coil 103 is actuated to effect the reversal of leads 2a and 3a, resulting in proper polarity as if the clamps 31 and 31a were correctly connected.

With the polarity of the battery correct, it will be seen that resistor 110 and diode 111 will apply a voltage of one diode drop across the base to emitter of transistor 109, but that the polarity will be in the direction opposite that required to cause the transistor 109 to conduct. Transistor 109 will therefore be cut off, transistor 106 will also be cut off and no power will be applied to the relay coil 103. The normally closed contacts of the relay as shown in the drawing will therefore connect the clamp 31 to the cathode K of said SCR and connect clamp 31a to the center tap 12b of transformer 12. This is the correct polarity for normal operation since normally clamp 31 is positive and clamp 31a is negative. If the clamp 31 and 31a are reversed, the resistor 110 will apply a forward bias to the base of transistor 109 turning it on. This will then allow current to be applied to the base of transistor 106 turning it on, which will allow a potential to be applied across the coil of relay 120, causing it to be energized, thereby causing the effect of a reversal of the connections to the battery charger.

The function of capacitor 104 is to keep the relay closed at all times, even though only half wave pulsating DC current is obtainable through diode 102 from winding 101 of transformer 14. A resistor 105 simply limits the current through the collector of transistor 106 preventing possible damage. Resistor 107 simply assures that when transistor 106 is to be off, it will be off. Resistor 108 limits the base current to transistor 106. Resistor 110 limits the base current to transistor 109. Diode 111 limits the voltage applied to transistor 109 to a value which will not exceed the base-to-emitter breakdown voltage, thus preventing possible damage to transistor 109 when the connections to the battery are correct and circuit operation is not desired. All of these preceding components are arranged in a manner well known to those skilled in the art.

It will of course be understood that various changes may be made in form, details, arrangement and proportions of the parts without departing from the scope of the invention herein which, generally stated, consists of circuitry capable of carrying out the objects above set forth, in the parts and combinations of parts disclosed and defined in the appended claims.

What is claimed is:

1. In a battery charger for a storage battery having circuitry including a primary charging path consisting of means to reduce the voltage of a power source to a level to be applied to a battery to be charged, means converting power from said power source to a pulsating direct current applied to an SCR and gating it on at the beginning of each selected half cycle and passing said current to the positive terminal of said battery wherein the improvement in circuitry in said charging path consists of voltage control and time control means of a battery charger, said voltage control means comprises a voltage low pass filter and sensing means, the same being connected to the leads of a battery as a charging input voltage source and having as its output a filtered voltage proportional to the Vmin voltage of a battery, said Vmin voltage being applied to a voltage comparator, means feeding a fixed reference voltage to said comparator, said reference voltage being proportional to an equalization voltage to be impressed upon said battery, whereby when said reference voltage is exceeded by said Vmin voltage from said battery, current flow through said SCR ceases and said voltage in said battery decreases, and when said Vmin voltage is less than said fixed reference voltage, said SCR resumes charging said battery to maintain said battery at its equalization level voltage, and means causing said time control means to run for the time of the equalization charge and to pause and hold its time setting in the event equalization charging ceases prior to the completion of the equalization charging cycle.

2. The circuitry of claim 1, including
   means causing said time control means to be energized when the commencement of equalization voltage charging is sensed.

3. The circuitry of claim 1, including
   voltage control means monitoring the Vmin voltage across the terminals of said battery at every half cycle during which near zero current is flowing.

4. The circuitry of claim 1, including
   internal thermal limiting means comprising
   a pair of thermistors of different values,
   one of said thermistors included in a transformer of said battery charger, one of said thermistors being included in thermal contact with a heat sink of said SCR, said thermistor in said transformer operating at a higher value than said thermistor in contact with said heat sink, either thermistor causing the input current to said battery to cease upon sensing an exceeded predetermined temperature, and said thermistors automatically permitting resumption of charging current upon attaining again a predetermined thermal operating range.

5. The circuitry of claim 1, including means being powered by said battery being charged to keep said time control means energized in the event of an input power failure, and means in connection with said last mentioned means preventing said time control means from changing its predetermined time setting during the time said battery is not being charged.

6. The circuitry of claim 1, including means causing said time control means to be inoperative until said means senses that the voltage of said battery to be charged exceeds the equalization voltage with the battery in open circuit condition.

7. The circuitry of claim 1, including means comprising an anti-sparking circuit which, responsive to a positive signal from said battery to be charged, produces a logic high signal preventing the triggering of said SCR until battery clamps are firmly applied.

8. The circuitry of claim 1, including means preventing the passage of odd numbered half cycles through the secondary of the transformer, said half cycles constituting a cause of excessive noise and self-heating in said secondary of said transformer.

9. The circuitry of claim 8, wherein said means preventing the passage of odd numbered half cycles comprises a flip flop circuit.

* * * * *